Figure 1:
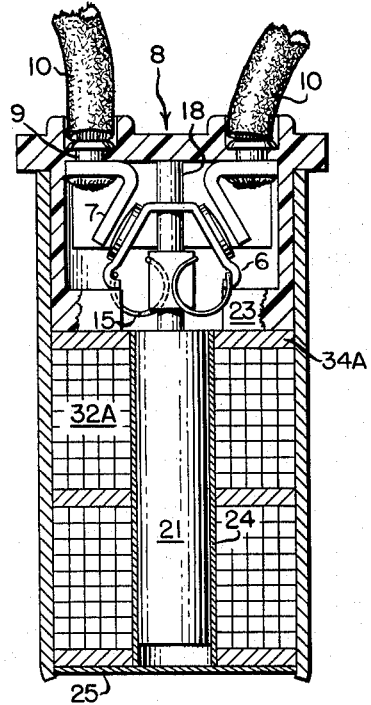

March 22, 1966     W. W. CLEMENTS     3,242,283
RELAY AND SNAP SWITCH CONSTRUCTION FOR SAME
Filed Dec. 4, 1962

United States Patent Office 3,242,283
Patented Mar. 22, 1966

3,242,283
RELAY AND SNAP SWITCH CONSTRUCTION
FOR SAME
Warner W. Clements, Los Angeles, Calif.
(13435 Java Drive, Beverly Hills, Calif.)
Filed Dec. 4, 1962, Ser. No. 243,313
7 Claims. (Cl. 200—87)

My invention relates to relays, and to snap switches particularly adapted for use therein.

There are currently being produced, by several manufacturers, relays of a type especially designed for installation in buildings and the like, as part of the permanent wiring systems thereof. Such relays are used to accomplish switching of the power circuits, thus replacing the more familiar flush switches. The relays permit the attainment of remote control in the switching operation. Certain important advantages are thereby gained, including the replacement of some of the power wiring by light-duty, low-power control wiring. These advantages are well known to workers in the wiring device field.

Granting the desirability of using relays in power wiring systems, there must still be found a place to put them. Safety considerations (as well as laws in most localities) dictate that each relay must be on or in a metal box, the box furnishing a firestop around the connections between relay and power line. In some instances, special boxes are installed to house the relays. However, it is often preferable to take advantage of the small boxes that are normally found in profusion in building wiring systems; namely, the regular junction and outlet boxes. Thus it is that relay designed for the indicated service are usually built with elongated bodies shaped to fit through the knockout holes to be found in the walls of these latter boxes.

Ideally, a relay would be mounted through a knockout hole in the same manner as is the conduit such holes were originally intended for; that is, the relay would have just its tip extending into the box from the outside. However, the relays available until now have without exception included radially enlarged portions which are too big to fit through standard knockout holes. Such enlarged portions must obviously be located either wholly outside or wholly within the boxes. But if they are located outside, then the relays cannot conveniently be either installed or replaced after walls are finished. (The cover of a box may be removable without tearing a wall apart, while the outside of that same box may be completely inaccessible.) Consequently, it is the usual practice to design the relays for installation with their enlarged portions mounted within the box and their elongated portions projecting outward through the knockout holes.

Meanwhile, space within standard wiring boxes is generally at a premium. Any of such boxes may be required to accommodate a number of bulky power wires along with the even bulkier splices in said wires. Furthermore, various studs and fittings may intrude into the box from the cover side. So it is understandable that installing electricians begrude the space taken up within boxes by the enlarged portions of relays.

It would quite obviously be a great improvement if the enlarged portion of each relay could be shrunk down to the same lateral dimensions as the already elongated portion, so that a relay could be mounted farther out through the hole, leaving within the box only a mounting flange and the power connections. It is safe to assume that the manufacturers would have long since made this improvement, had it been within their skills to do so.

In the usual case, the undesirably enlarged portion of a relay houses a power switch. The principal reason that it has been previously impractical to make the enlarged portion smaller is that it has been impractical to make the power switch smaller. Now, it is true that there can be found on the market separate power switches that are smaller than the ones on the relays in question. However, to be used in these relays, a switch must meet special requirements. It must work on a straight-line push or pull from the actuator component without developing appreciable friction or side-pull. It must be actuable with minimum effort, so that an oversized relay motor will not be required. It must also incorporate—or allow for and work with—a bistable biasing means, so that the relay need not be energized continuously. There just simply has not been available until now, at least at reasonable cost, a switch design that will meet these requirements and that will at the same time permit itself to be made small enough laterally to fit down into the barrel (or elongated portion) of the relay.

It is an object of my invention to provide a relay design in which the lateral size of the switch portion has been made radically smaller than that obtaining in the comparable prior relay art. (When I speak here of the "comparable prior art," I refer, as previously indicated, to relays designed for the wiring-device application. However, the very same characteristics that make relays according to my invention superior for this particular application may also serve to make them superior for other and vastly different applications. Therefore, I do not consider my invention to be one that is limited in any sense by virtue of its primary applicability in the given field.)

It is another object of my invention to attain the aforesaid improvement in switch shape and size while at the same time maintaining and even improving upon overall relay performance ratings.

Illustrative embodiments

Figure 2:
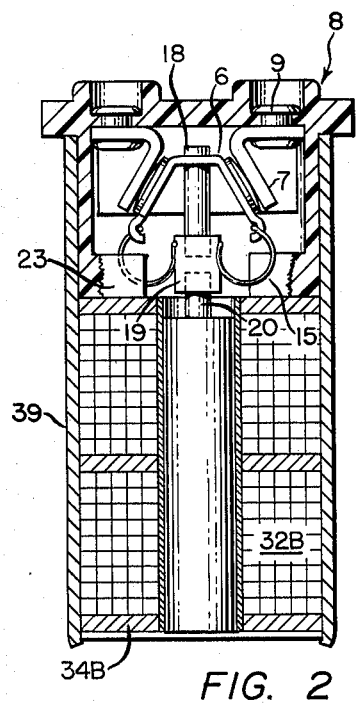
Figure 3:
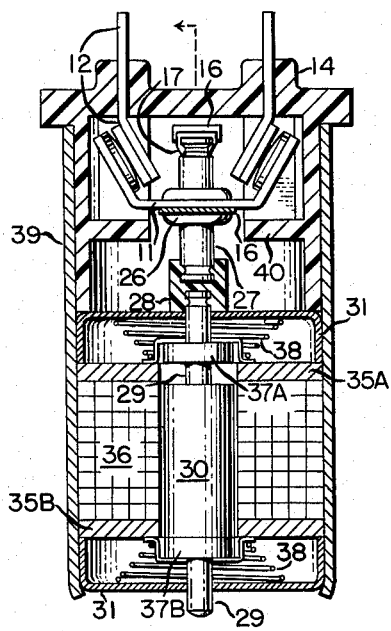
Figure 4:
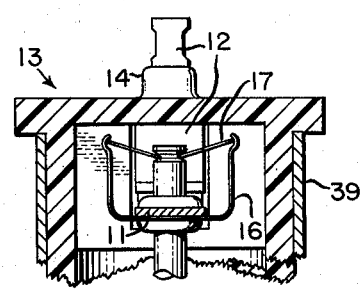
Figure 5:
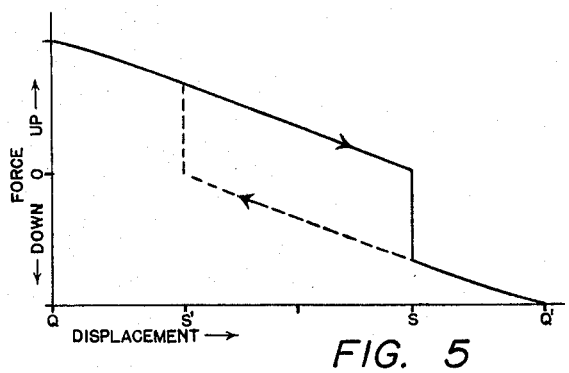

FIGS. 1 and 2 depict a first illustrative embodiment according to my invention. FIGS. 3 and 4 depicts a second illustrative embodiment. FIG. 5 is a graph relating to the performance of the biasing means in the embodiment of FIGS. 1–2.

FIG. 1 is an elevation. The larger stationary parts are shown centrally sectioned, with the exception of abutments 23, which constitute interior features of sub-housing 8. The smaller parts and the movable parts are not sectioned. The movable parts are shown as they would appear with the device in a first of its two possible stable or quiescent conditions.

FIG. 2 is a view similar to that of FIG. 1, except that movable parts are shown shifted each to the alternate position corresponding with the second of the stable or quiescent conditions of the device. Also, wire leads 10 are omitted to show more clearly the wells into which they fit.

FIG. 3 is an elevation of the second embodiment, with its larger stationary parts centrally sectioned. Of the movable parts, the two conical springs 38 are sectioned. Also, "C-squeezer" spring 16 has its arm nearest the observer broken off to reveal detail behind it.

FIG. 4 is an elevation of the upper portion of the same embodiment as FIG. 3, with movable parts in the same (rather than a shifted) position. However, FIG. 4 is a view taken from a position revolved 90° around the principal axis of the device. The nearest arm of contact bar 11 is shown broken away to reveal detail beyond.

FIG. 5 has longitudinal force on the armature, as exerted by the overcenter means, plotted against armature displacement. The abcissae of the two quiescent positions of the armature are indicated at Q and Q'; the abcissae of the two snapover points are indicated at S and S'.

For convenience, I herein take as the top of an embodiment that end which stands toward the top of the page in the drawings. However, in actual application there is no preferred attitude for either device; it may be mounted in any position. Aside from considerations of position, the longitudinal axis is in any case taken to be that of coil and armature.

The two embodiments shown are representative of several that might have been selected. Elements are, to a large extent, interchangeable between the possible embodiments. For these reasons, I shall describe one element at a time rather than one embodiment at a time.

Switch contact conformation

Both of the illustrative embodiments utilize what is called a "double-break" switch. In a switch of this type a circuit is usually closed by bringing a movable, electrically conductive contact bar into simultaneous (more-or-less) engagement with two fixed contacts. In order that this may be done, it is necessary that the bar be mounted to be movable as a unit into the engaging position. In other words, a contact bar does not flex or pivot into engagement, but moves bodily. Although the element takes its name from its more usual shape, it is its design to be moved as a whole into double contact engagement, rather than a particular shape, which distinguishes a "contact bar" as the term is used herein. Where the indicated type of switch has been used as part of a small relay, it has been almost universally the practice in the past to align the faces of the fixed contacts and the contact faces of the movable bar in planes respectively normal to the path of travel of the bar. In other words, the respective contact members have been so mounted that their contacting surfaces make a direct, face-to-face approach to one another in the act of closing.

The present invention calls for a substantial departure from this practice. In both embodiments the contact bars are mounted for travel in directions that appear vertical in the drawings. Yet, the meeting faces of the respective contacts are not horizontal. Rather, they are obliquely mounted, so that their approach to one another is not direct but contains a sideways component. In FIGS. 1 and 2 the contact bar is indicated at 6. It can be seen to include arms or ears which are bent downward from the central bearing portion. In the drawings these arms or ears are shown as including contact "points," which points may be welded in place. However, those skilled in the art will appreciate that points per se are an optional feature and may be dispensed with if desired. Whether or not separate points are provided, there must be areas intended as contact surfaces, and these surfaces are herein considered to be parts or features of the bar.

Fixed contact members 7 are shaped and positioned to engage the contact surfaces of the contact bar when the latter is at the upper extreme of its travel. (Since they lack separate points, these latter members should preferably be made entirely of precious metal.) The fixed contacts are mounted to insulating sub-housing 8 by means of eyelets 9. Wire leads 10 are inserted through the eyelets and soldered in place to permit connection to external circuitry. When the fixed contacts are shorted by the movable bar, the switch is, of course, "closed." Thus, FIG. 1 shows the switch in open condition and FIG. 2 shows it closed.

Turning to the embodiment of FIGS. 3–4, here the movable contact bar is indicated at 11. Its contact portions are bent upward rather than downward, and they engage the exterior rather than the interior aspects of fixed contact members 12. It can be seen that the geometric principle involved is the same, however. This principle would still apply, in fact, if the switch were arranged to be closed on a downward, rather than an upward, movement of the contact bar. That is to say, there are obvious inverted equivalents of the contact conformations in the drawings. Similarly, another equivalent arrangement might have the contact portions of the movable bar bent beyond the 90° point, so that their free ends would point toward, rather than away from, the axis of the device. (While I speak here of the bar being "bent," it should be appreciated that there are ways of fabricating an equivalent member other than by literally bending it.)

In both FIG. 3 and FIG. 4 the switch is shown in closed condition. The fixed contact members 12 are shown as including points, which will usually be of precious metal, and which may be welded in place. The fixed contact members are mounted to the insulating sub-housing 13 by having their shanks molded into said housing as the latter is fabricated. The shanks extend out of the upper side of the sub-housing, where the extensions are used as soldering lugs for the purpose of making external connections. When such external connections are completed, they may be insulated by means of a sleeve or wrapping which extends over, or anchors to, bosses 14.

The oblique contact angle is a central feature of the invention. One of the benefits it confers is conservation of lateral space. Where miniaturization of a double-break switch is carried out to the degree that the invention makes possible, the necessary diameter of the contact surfaces looms large by comparison with other measurements. It doesn't loom so large that there wouldn't be room for the contacts alone, but extra room must be provided for actuating, mounting, and electrically connecting arrangements. The oblique contact arrangement not only provides added space for these latter arrangements, but it proves to be more topologically suited for squeezing them in. For instance, it is difficult to fasten a wire to the back of a contact surface, but there are various schemes available for making the connection at one side of the contact. With the slanted arrangement, a fixed contact conveniently presents its edge, rather than its back, to an incoming wire.

An incidental benefit of the oblique contact angle is that it imparts at least a degree of self-cleaning properties. It can be seen that a particle of dust or corrosion on a contact surface will not merely be squeezed as the contacts close; it will be rolled or deflected and probably dislodged. This wiping effect can be increased by building-in a degree of springiness to the contact supports. However, designers are warned not to overdo the latter measure, as it may introduce an undesirable amount of friction, especially where the degree of angling is high.

The oblique contact angle has an effect on contact pressure and spacing. Where the face of a movable contact is not positioned normal to its motion, it can be seen that a stroke that would otherwise be sufficient to produce a given contact spacing will not be long enough. By the same token, two contacts pressed together by forces acting at an angle to their face plane will have their effective meeting pressure increased over that of the applied forces (according to the principle of the inclined plane). By comparison, then, the oblique arrangement necessitates a longer stroke of the movable member, but allows that less steady-state pressure in the direction of the stroke will suffice. In the past these characteristics have been considered as undesirable ones in a switch destined for use in a relay, since an electromagnetic relay motor is considered to be better adapted to produce pressure than stroke. Notwithstanding, the long-stroke, low-pressure characteristics of the oblique-contact switch are a positive benefit in the combination herein described. Just why this should be so is one of the unobvious things about the invention. It will be made clear in the sections to follow.

Overcenter means

A typical remote-control switching installation, say in a house, will contain at least several, and perhaps several dozen, relays. If each of these relays were to draw continuous coil power under some circumstances, the cost to the homeowner would be appreciable. Moreover, the accumulated current would be large enough so that it would require a hefty supply source, one perhaps powerful enough to start a fire in case of a short. For these reasons, relays intended for the indicated service are designed so that each draws current only at the instant its included power switch is being "thrown" one way or the other by remote control. In the quiescent condition no current is drawn.

In practice this means that for purposes of providing static biasing or positioning forces to bear on the switch contacts, a simple return spring (as found connected to the armature in relays used elsewhere) will not suffice. Instead, switch actuation must be rendered bistable through the employment of an overcenter means.

In the illustrative embodiment of FIGS. 1–2, the overcenter means takes the form of two clip springs 15. Each of these is under tension biasing its two bent-over ends apart from each other. Most of this tension is expended radially, whereby it is cancelled out and has no appreciable effect. However (except under the transient condition wherein the ends of the springs are all perfectly lined up in the transverse sense), there is also a longitudinal component to the force developed and in the longitudinal sense the forces of the respective springs add together rather than cancelling. It is the longitudinal force which renders the switch condition bistable, holding it "off" as in FIG. 1, or "on" as in FIG. 2.

The biasing arrangement of FIGS. 3 and 4 is basically quite similar. Here, the actual force is developed in "C-squeezer" spring 16, and is transmitted inwardly by rigid pushers 17. Here, too, the pressures are largely radial, developing longitudinal components as the angle of the pushers departs from a strict right angle to the longitudinal path of the pushed fitting.

To describe generically springs 15, rigid pushers 17, and their various equivalents, I shall use the term "tilting pushers." As should be obvious, the term is intended to designate a component which serves operationally to deliver or transmit a push, and which is obliged, in the course of active operation, to tilt or change its angle with respect to fixed components of the same device. Further, I intend the term to apply only to a discrete member or assembly which does its tilting in its entirety as one unit or whole. Such operation necessarily requires that the unit be fully articulated at its points of joinder with other structure and the condition of articulation is intended to be implicit in the designating term. (Because of the connoted compressive stress on a "pusher," it follows that there must be two pivotal axes about which articulation is required.)

Such "tilting pushers" are the distinguishing feature of a distinct type of overcenter mechanism, of which type there are several variations already known to the prior art. The following references disclose examples of overcenter mechanisms of this type:

2,918,544, Koenig, December 22, 1959
1,439,231, Erickson, December 19, 1922
403,922, Great Britain, December 27, 1933

A study of these references will reveal that the overcenter mechanism disclosed in each differs in respects from the others, as well as differing from the two mechanisms disclosed herein. Nevertheless, in each case tilting pushers, as defined above, are utilized. Moreover, in all five cases the operating principle is essentially the same; it may be seen that the characteristics and applicability of the various versions are similar while being at the same time quite different from those of other types of overcenter mechanisms, such as snap disc types. There appears to be no particular name for the kind of overcenter mechanism here exemplified, despite its being a distinct type, so I shall be obliged to call it the "tilting-pusher-type overcenter mechanism."

Tilting-pusher mechanisms have certain distinctive advantages.

A very important one is that they can be made considerably smaller radially than other overcenter mechanisms which will work with linear actuation. This should be obvious, since virtually at a single point in a pivot or joint there may take place a degree of flexure which would, by contrast, have to be spread out over a considerable expanse of a bending spring to prevent breakage of the latter.

A second characteristic of tilting-pusher-type overcenter mechanisms is that they develop their maximum biasing effort at the beginning and end of the actuating stroke, with said effort tapering off toward the snapover point. This is illustrated in FIG. 5, which is the actual biasing-force vs. armature-travel characteristic of the embodiment of FIGS. 1–2. The corresponding characteristic of the embodiment of FIGS. 3–4, though not shown, is very similar and even more linear in the continuous portions. (What curvature there is in the latter characteristic has the opposite sign.) This performance contrasts markedly with that of such overcenter mechanisms as those stamped in one piece from spring-metal sheet. The latter develop their maximum biasing effort at points well away from the quiescent positions, often right at the snapover point.

The tapered bias characteristic exemplified by FIG. 5 lends advantages to the combination of the instant invention that it would not lend to other combinations. In particular, it helps make possible the use of a type of relay motor which it is desirable to use for unrelated reasons, but which motor could not be economically used to perform a mechanical task unsuited to its own respective characteristics.

Further than that, the tapered characteristic is a desirable one in its own right. It applies the maximum force during the period when it will do the most good, namely, during the quiescent "on" period. It is during this period that contact resistance must be kept low in order to avoid heating and contact failure. By contrast, in those other mechanisms which develop maximum bias at points other than the extremes of actuator travel, it naturally follows that maximum bias will be developed only for a brief transient instant during each actuation. Since the maximum bias is set by the maximum actuation force available to overcome it, and since the quiescent bias must be enough in any event to provide the requisite contact pressure, then the transiest bias peak can be handled only by the provision of costly reserve power in the actuation source. This reserve power is not necessary in systems employing the tilting-pusher overcenter mechanism. If a motor is capable of just starting a stroke against biasing of the latter type, the strobe should go all the way.

A third characteristic of tilting-pushing overcenter mechanisms is that they are, by comparison with other overcenter mechanisms, much more predictable in their performance, and much easier to hold to consistent performance standards. The importance of these qualities to successful quantity production need scarcely be amplified upon.

*Contact bar suspension*

In the illustrative embodiment, the switch elements already described separately are combined and mounted in a novel manner. The movable contact bar is mounted for inverse, floating action, as is its counterpart in some prior art devices. But beyond that, it has a unique stable suspension. This feature is related to the oblique-contact feature, as will now be explained.

In FIGS. 1 and 2, movable contact bar 6 includes a central bearing portion which is drilled to admit stub shaft 18 in a loose sliding fit. The stub shaft has its lower end molded or cemented into ferrule-like fitting 19, which is made of insulating material. Fitting 19 is, in turn, connected to actuator shaft 20, and the latter is connected to armature 21. Armature, actuator shaft, ferrule fitting, and stub shaft together form an integral, rigid assembly.

The contact bar is free to slide on the stub shaft under the urging of springs 15. However, its range of travel is limited to that between where it engages the fixed contact members 7 and where its lower, hooked ends engage abutments 23. The armature, for its part, is suspended by brass tube 24, in which it free to slide lengthwise. However, its range of travel is limited to that between where it strikes non-magnetic cover plate 25 on the downward trip and where the stub shaft strikes the top of sub-housing 8 on the upward trip. The permitted stroke of the armature is longer than that of the contact bar. As the armature moves downward (in the process of actuation) from its position of FIG. 1, the contact bar will remain stationary until the ends of springs 15 are horizontally in line. This corresponds with moving along the graph of FIG. 5 from point Q to point S. At the latter point the contact bar snaps upward to rapidly engage the fixed contacts and "make" the external circuit. Simultaneously, the longitudinal force exerted on the armature in an opposing sense by the springs is reversed and the springs now urge the armature along its way toward the downward end of its stroke. On the next actuation, the converse set of events takes place.

The first thing that may be noted from this description is that the movement of the contact bar is actually in the opposite direction from that of the armature. Further, there is no rigid actuating connection to the contact bar. This is what I meant by my previous reference to a "floating, inverse action" of said bar. Such an action may also be found in the prior art, notably in the Koenig reference already mentioned.

Another thing which might be noted at this point is that the function of the overcenter means, as so far described, amounts to the provision of a bias which urges contact bar and armature toward opposite ends of their respective ranges of travel.

But springs 15 fulfill a further function. They help to support and steady the movable contact bar. It is important to note that they apply their steadying pressures at a point longitudinally removed from the bearing through which the stub shaft slides. The contact bar is thus stably, yet resiliently suspended. (The resilience is important to ensure that contact pressure can distribute itself equally bewteen the two sets of contacts, when closed.) Such a stable suspension cannot be found in the comparable prior art. In Koenig, for instance, all suspension of the "contact assembly" takes place at virtually a single point, in the longitudinal sense. The importance to a floating inverse action, double-break switch of improved stability of the contact bar is that it considerably lessens the tendency of the two sets of contacts to make and break one-at-a-time. This tendency is to blame for undue wear on both pairs of contacts and for the concentration of all ionic erosion on a single pair, that one which consistently parts company last.

The stable suspension feature could doubtless be added to a prior art device such as that taught by Koenig. However, to make the addition would cost dearly in terms of the added cubic space required. By contrast, in the combination of the subject invention the space is already there and waiting. This comes about because the obliquely angled contact feature trades lateral space for longitudinal space and comes up with plenty of the latter to spare. It will be clear from drawings, especially from FIG. 3, that if the overcenter means were to be completely eliminated from an embodiment, the overall switch size still could not be appreciably reduced. Which observation merely confirms that the overcenter means fits neatly into space which the strategy of the invention makes available for it.

The overall operation of the switch in the embodiment of FIGS. 3–4 is in every way analogous to that in the first embodiment, as just described. The specific construction is slightly different. Movable contact bar 11 and "C-squeezer" spring 16 are fastened together, by means of eyelet 26, with their principal planes at a right angle, but with their arms extending in the same longitudinal direction. Eyelet 26 is a loose sliding fit on stub shaft 27, which is in turn rigidly connected via insulator 28 and main shaft 29 to armature 30. As in the other embodiment, both the contact bar and the armature are limited in stroke to that between predetermined extremes, the stroke of the former being the shorter. As before, the overcenter means, this time comprising spring 16 and pusher arms 17, operates to bias contact bar and armature toward opposite extremes of their respectively permitted travel.

It may not be immediately evident how the longitudinally stabilized suspension is achieved in the second embodiment, but a little study will make it clear. Pushers 17 are notched at their inner ends, so that they grip the stub shaft securely. Then, any rocking of the contact arm within the central plane of FIG. 3 can only be achieved at the cost of imparting a twist (as distinct from a bow) in each arm of spring 16. The contact bar is thus stabilized while retaining resilience of mounting.

Switches designed in accordance with the teachings herein can be made to fit through standard knockout holes with room to spare. Not only are they reduced in lateral size, but in overall cubage as well. One of my experimental models measures to less than ¼ cubic inch, including housing. Yet it has performed well in tests, and it should earn a contact rating exceeding that of switches four to six times its size. One factor militating in favor of high contact ratings is that the switched current doesn't have to flow through a spring member, nor through a flexible member of any kind.

*Motor*

The principal parts of a relay are the switch and the motor. The strategy of the present invention demands a motor which meets the shape and size requirements emanating from the principal application, and which is, at the same time, adapted to work well with the switch arrangements already described. The motor which best meets these demands is that which incorporates an elongated armature mounted to slide backward and forward in a straight line lengthwise through the central opening in the energizing coil. This is usually referred to as the "solenoid-type motor," and I shall adopt the term for use herein.

In both illustrative embodiments the motors qualify, by virtue of armature conformation and mounting arrangements, as solenoid types under the foregoing definition. The mounting of movable parts in the FIGS. 1–2 embodiment has already been described. The arrangement in the embodiment of FIGS. 3–4 is somewhat different. In the latter, armature 30 is supported by shaft 29, which runs clear through the armature and extends from both ends thereof. However, the armature doesn't slide on the shaft. Rather, it is affixed thereto, while the shaft itself slides freely through holes in bearing-spacer-retainer cups 31.

In the usual solenoid-type motor, the armature is attracted magnetically in only one direction; a spring or equivalent means is relied upon to return it to its starting point upon the cessation of energization. By contrast, the present invention calls for a motor which is capable of delivering either a push or a pull, as the occasion demands, upon brief and discontinuous application of coil power in either case. To describe a solenoid-type motor which is capable of the more complex operation just defined, I shall add the adjectivial phrase, "two-way-attraction."

The motors in the respective illustrative embodiments achieve two-way-attraction performance in totally different ways. The arrangement of FIGS. 1–2 is, in a highly abstract sense, something like two locomotives facing in opposite directions and coupled back-to-back, one to provide locomotion for travel of the pair in one direction, and the other for the other direction. On the other hand, the arrangement of FIGS. 3–4 is more like a trolley car, which last constitutes a single unit which may conveniently be arranged for travel in either direction. I will describe the differing operation of the two embodiments after I discuss in some detail something they have in common; namely, the type of conformation of their respective working gaps.

In an electromagnetic relay motor, the useful mechanical actuation is, as is well known, developed in the process of permitting an air gap in a magnetic circuit to close. The usual and expected way for a working gap to close is for an armature to be attracted to a pole. However, it is not necessary that an armature move to a pole in order that work may be accomplished. It may be enough if the armature moves parallel to the pole. The essential thing that is accomplished when a working gap "closes" is that its reluctance is decreased. It should not be overlooked that a decrease in reluctance can be accomplished as well by an increase of gap area as by a decrease of gap length.

My invention utilizes motor constructions which feature what I call the "tangentially closing gap." What I specifically mean by the term is a gap so conformed, with armature travel so arranged, that upon the closing of the gap the predominant magnetic effect for the latter part of the armature stroke is an increase in gap area rather than a decrease in gap length. Note carefully that this definition does not rule out a shortening of the gap length. In deed, in preferred embodiments a change in effective gap length is the predominant effect for the initial part of the closing stroke, with the change in area taking over later. That is to say, the armature first approaches the pole and then proceeds alongside it, much as a railroad train approaches a station house but never hits it.

The motors in the two illustrative embodiments differ from each other, but each utilizes the tangentially closing gap. The motor of FIGS. 1–2 actually includes two magnetic circuits. In FIG. 1, the working gap in the upper magnetic circuit is closed. Under these circumstances, if coil 32A is energized, nothing will happen. Meanwhile, at the bottom of the device a gap exists between armature 21 and pole disc 34B. If coil 32B is energized, the armature will be drawn downward to its position of FIG. 2. This action opens up a gap (also of the tangentially closing variety) at the upper end of the armature, between said end and pole disc 34A. The stage is thereby set for an upward stroke of the armature when coil 32A is later energized. In the normal operating environment, a small switch at a remote location is arranged to energize coil 32B when it is desired to turn the power switch "on," and to energize coil 32A when it is desired to turn the power switch "off."

The embodiment of FIGS. 3–4 utilizes an improved type of motor which is not only condensed and simplified internally, but which simplifies and improves the control circuitry as well. A detailed description of this motor is beyond the scope of the present document. Such a description can be found in my Patent Number 2,885,606 issued May 5, 1959, and in my Patent Number 2,972,091 issued February 14, 1961. What should be noted in the present connection is that the tangentially closing gap is an inherent, rather than an optional, feature in the improved motor.

In FIG. 3, the gap is located between the upper end of armature 30 and pole disc 35A. If coil 36 be energized while the movable parts are in their position of FIG. 3, the armature will be attracted upward to its alternate stable position, where stub shaft 27 abuts the cover of sub-housing 13. In a magnetic sense this action is identical with that that takes place in the other embodiment. During the stroke, magnetic segment 37B sticks to the armature and forms an effective extension thereof. Segment 37A, meanwhile, takes no part in the proceedings, being moved up and away from the working gap by a yoke which is not visible in the drawing. But upon de-energization, the movable parts will assume a position which (regarding the motor only) is the inverted image of their position in FIG. 3. Segment 37A will then be set to assume the role fulfilled in the previous circumstances by segment 37B. The working gap will then be at the bottom, and the stage will be set for reciprocal actuation upon the occasion of the next subsequent energization. It can be seen that the tangentially closing gap makes its appearance alternately at the upper and at the lower end of the armature.

As for the control circuitry, the relay does the thinking for the user as to whether "on" or "off" is due next in the switching sequence. The switch at a remote point is accordingly reduced to controlling but a single circuit and the user doesn't have to make a conscious choice between two ways of manipulating it. (In the event that it is desired to retain that choice upon the part of the user, it is possible to do so with the aid of a simple feedback arrangement.)

Theory of the tangentially closing gap

Until the issuance of those two of my patents previously referred to herein, the use of the tangentially closing gap in small relay-type motors was virtually untaught. Being a gap design that is unfamiliar to workers in the field, it is apt to be regarded as "less efficient" than the directly closing gap. Now, if the "efficiency" of a relay motor is taken to be indicated by mechanical work out (per energization) divided by coil power in, then it should be evident that neither gap arrangement has any inherent advantage over the other. This follows from the fact that the tangentially closing gap can have respectively the same "before" and "after" reluctances as its directly-closing counterpart. The theory of electromagnets states that it is the change in reluctance which determines the total work output; other things being equal, the total is not affected by the manner in which the change is brought about.

However, the above-phrased definition of efficiency may be inadequate. Work expended and work accomplished are two different things! It is a sad fact that usually only a small portion of the work delivered by a relay motor is usefully harnessed to "throw" or actuate a snap-type switch mechanism. The rest is wasted and may contribute to contact bounce or other undesirable effects. The waste in work comes about because of the difficulty in matching the force vs. travel curve of the motor to that of the switch. Here, the directly-closing-gap motor is at a considerable disadvantage. The force developed by a directly closing gap follows an inverse square law. It is feeble at the start of the stroke and becomes enormous at the end of the stroke. No snap switch ever likely to be devised can be made to match a characteristic like this. The large amount of work delivered by the motor right at the tail end of its stroke is bound to be wasted, if only for the reason that the switch has already gone over center by that point.

By contrast, the tangentially-closing-gap motor has a force-travel characteristic that is much smoother and neither starts so low nor swoops so high, relatively speaking. It does have traits of its own, but none of these represents a well-nigh unbeatable defect, as does the inverse-square law. In short, of the two types of motors, the tangentially-closing gap motor is *inherently* capable of the greater efficiency in the relay application. If this inherency has yet to be harnessed in the relay art, it can only be because the practitioners of that art have not discovered how to do it. The present invention points the way.

Motor in application

By comparison with the directly-closing-gap motor, the tangentially-closing-gap motor has certain distinctive characteristics that must be respected if it is to be employed to best advantage: First, it is most efficient when providing relatively less force. Second, it will deliver that reduced force over a longer stroke. Third, in its most convenient forms it will have a force-travel curve that starts quite high at the outset of the stroke and tapers downward thereafter.

Now, the characteristics of the switch assembly already described should be recalled. The oblique-angle contact assembly has smaller-than-usual actuator force requirements. It also has greater-than-usual actuator stroke requirements. At the same time, the overcenter mechanism using the tilting pushers has a resisting-force vs. displacement characteristic that starts at its maximum and tapers off thereafter, as illustrated by FIG. 5. In short, the switch assembly provides just the kind of a mechanical load the motor calls for. Working in harness they provide a high degree of efficiency and general excellence. My own experimentation has confirmed this. Preliminary results suggest that commercially produced relays embodying the invention will maintain the switch ratings of their rivals, while surpassing the latter (given comparable motor sizes) in the matter of coil sensitivity, not just by a few percent but by a very large margin.

*Miscellaneous considerations*

Taking advantage of the reduction in radial size of the switch made possible by my invention, both illustrative embodiments have their switch and overcenter means housed in the same overall case 39 which houses the motor. This case is cylindrical in the embodiments in question. It is made of mild steel, and besides providing overall housing it also serves as part of the magnetic circuit in each instance.

The illustrative embodiments each have sub-housings, shown at 8 in FIGS. 1–2 and at 13 in FIGS. 3–4. These sub-housings serve to support and protect the snap-switch components, to form a closure for the upper end of the case, and to provide a mounting flange. As inner features, the cases provide the abutments (at 23 in FIGS. 1–2 and at 40 in FIGS. 3–4) which serve to limit the downward travel of the respective contact bars. As another inner feature, each housing is shaped to confine its contact bar in a close fitting opening having vertical sides, so that the contact bar is kept from rotating around its shaft, with the contact portions being kept in line to engage the fixed contacts.

A sub-housing must be made of insulating material; preferably it would be molded from thermosetting plastic. However, if it were molded in a single piece, assembly of the switch parts might be difficult or impossible. Because of the inner features, it should be designed to be assembled from at least two parts. No division between such parts is shown in the drawings because there are several possible dividing-up schemes. A suitable one for use in a given case can readily be devised by one with ordinary skills.

Similarly, the drawings have omitted the means for making electrical connections to the coils of the relays. Those skilled in the art will understand that such means are necessary and implied. They would preferably take the form of small lead wires extending from the bottoms of the cases.

Additional apparatus, not shown, may readily be included as part of each relay. For example, in many instances there will be a low-voltage switch built into the bottom end of the case, there to be actuated by connection to the bottom end of the armature. In other instances there will be a transformer mounted at the top end of the case, taking advantage of the space made available by moving the switch down into the case. For details on such a transformer installation, reference may be had to my co-pending application Number 226,329, filed September 26, 1962.

What I claim is:
1. A relay, including:
a solenoid-type two-way-attraction motor employing the tangentially closing type of working gap, the travel of the armature of said motor being limited to that between two fixed extremes;
a movable contact bar slidably mounted adjacent the motor for independent motion in line with the motion of the armature, the travel permitted to said contact bar being limited to that between fixed extremes which define a range of travel shorter than that permitted to the armature, said contact bar including contacting surfaces aligned obliquely to the direction of travel;
means for biasing the armature and the contact bar toward interchangeably opposite extremes of their respectively permitted travel, said means comprising a tilting-pusher-type overcenter mechanism and structure connecting the armature with the contact bar through said overcenter mechanism;
and means comprising fixed contacts for making circuit-closing engagement with respective contacting surfaces on the contact bar at at least one extreme of the travel of said bar.

2. A relay, comprising:
a movable contact bar mounted for reciprocative linear travel over a fixed range, said contact bar including contacting surfaces aligned obliquely to the direction of travel;
means comprising fixed contacts for making circuit-closing engagement with respective contacting surfaces of the contact bar at at least one extreme of the travel of said bar;
a motor embodying the tangentially closing gap conformation, said motor including a slidably mounted armature aligned with and coupled to the contact bar;
and means for rendering the quiescent positioning of the contact bar bistable at its extremes of travel, said means comprising a tilting-pusher-type overcenter mechanism mounted at least partially within the region between the contacting surfaces of the contact bar.

3. A snap switch, comprising:
a shaft mounted to be longitudinally actuable through a limited range of travel;
a contact bar having a central bearing portion by means of which said contact bar is slidably mounted on the shaft, and further having two side portions which extend obliquely away from the bearing portion in longitudinally similar but laterally opposite directions, whereby space is conserved, the side portions respectively including contacting surfaces sharing their oblique alignments;
means for limiting the longitudinal movement of the contact bar to an independently fixed range of travel which is shorter than that of the shaft;
means comprising fixed contacts for making circuit-closing engagement with respective contacting surfaces on the contact bar at at least one extreme of the travel of said bar;
and means for biasing the shaft and the contact bar toward interchangeably opposite extremes of their respectively permitted travel, said means comprising a tilting-pusher-type overcenter mechanism resiliently linking said bar to said shaft, said mechanism including opposing pushers located, in a longitudinal sense, in that region occupied by the side portions of the contact bar, whereby space is further conserved and the support of said pushers is effective upon said bar at a point removed longitudinally from the support at its bearing.

4. The snap switch of claim 3 further characterized in that the contact portions of the contact bar each depart from a plane normal to the shaft by angles respectively in excess of 30°.

5. The snap switch of claim 3 further including housing at least partially made of insulating material, said housing providing as interior features stops for limiting the travel of the shaft and the contact bar, and walls lying in planes parallel to the shaft and loosely confining the contact bar to prevent rotation of said bar around the shaft.

6. A relay, comprising:
the snap switch of claim 3;
and a solenoid type two-way-attraction motor incorporating the tangentially-closing gap conformation, said motor being mounted longitudinally adjacent to the snap switch with the shaft of said switch connected to the armature of said motor for actuation of the switch by the motor,
whereby an advantageous match is secured between the drive requirements of the switch and the drive capabilities of the motor, and an advantageous match in size and shape of switch and motor is likewise secured.

7. The combination of claim 5 further including an elongated housing of substantially uniform cross-section substantially enclosing all of the elements of said combination.

References Cited by the Examiner
UNITED STATES PATENTS

| | | | |
|---|---|---|---|
| 1,803,908 | 5/1931 | Lansing | 200—111 |
| 2,278,967 | 4/1942 | Allen | 200—111 |
| 2,297,403 | 9/1942 | Glassing et al. | 200—87 |
| 2,415,448 | 2/1947 | Stilwell | 200—87 |
| 2,416,358 | 2/1947 | Stilwell | 200—87 |
| 2,417,438 | 3/1947 | O'Brien et al. | 200—87 |
| 2,714,141 | 7/1955 | Urey et al. | 200—111 |
| 2,923,864 | 2/1960 | Blakistone | 200—111 |

ROBERT K. SCHAEFER, *Acting Primary Examiner.*